RE 24678
TRANSISTOR CONTROL APPARATUS
Filed Dec. 29, 1954
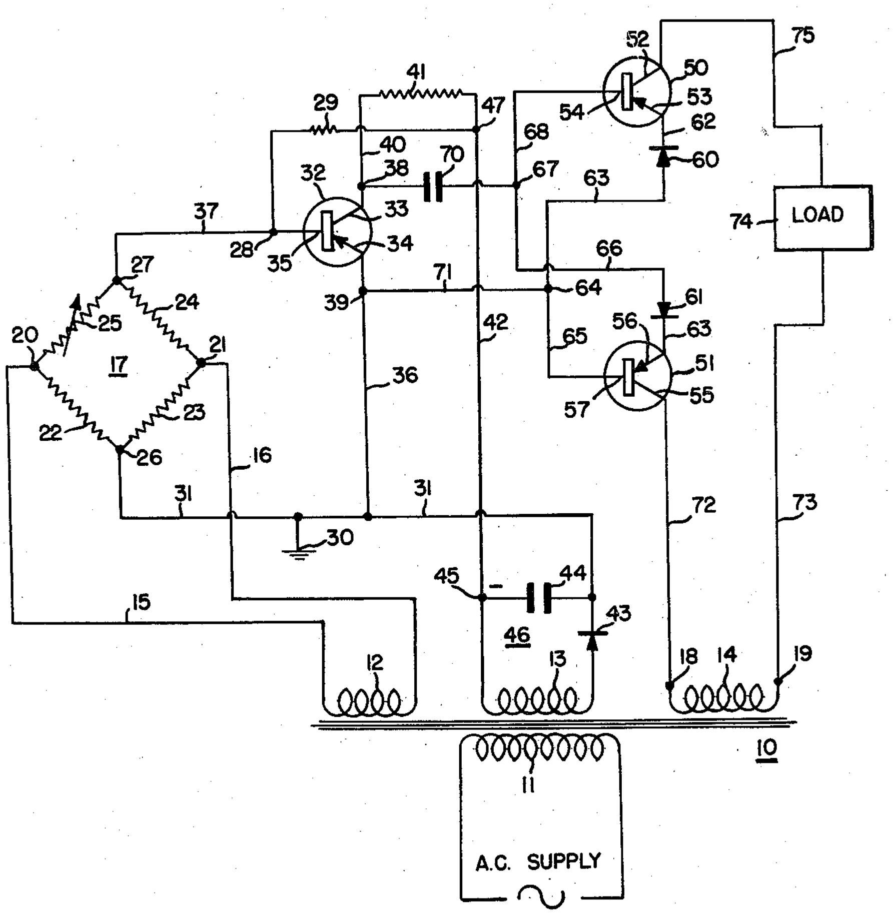
INVENTOR
B. H. PINCKAERS
BY Frederick E. Lange
ATTORNEY 2,872,595
Patented Feb. 3, 1959

2,872,595

TRANSISTOR CONTROL APPARATUS

Balthasar Hubert Pinckaers, Hopkins, Minn., assignor to Minneapolis-Honeywell Regulator Company, Minneapolis, Minn., a corporation of Delaware Application December 29, 1954, Serial No. 478,469

7 Claims. (Cl. 307—88.5)

This invention relates to transistor control apparatus and more specifically to a new and improved transistor discriminator circuit. The transistor discriminator circuit which provides an A. C. output is so constructed that the input and output transformers previously required in discriminator circuits of this type have been eliminated. The invention describes a transistor control apparatus which supplies A. C. power to a load device when the input signal potential is of one phase, proportional to the magnitude of the signal potential, and supplies no power to the load when the signal is of the opposite phase.

An object of the invention is to provide an improved and simplified transistor discriminator circuit which is selectively responsive to an A. C. signal potential to produce an A. C. output proportional in magnitude to the signal.

Another object of the invention is to provide a transistor discriminator circuit which has no input or output transformer and which provides an A. C. output to a load device.

These and other objects of the present invention will be understood upon consideration of the accompanying specification, claims and drawings of which:

The single figure of the drawing is a schematic diagram of the improved transistor discriminator circuit comprising the invention.

Referring now to the single figure of the drawing there is shown a transformer 10 having a primary winding 11 connected to a suitable source of alternating current and having secondary windings 12, 13 and 14. Secondary winding 12 is connected by conductors 15 and 16 to input terminals 20 and 21 of a resistance bridge circuit 17. The bridge 17 comprises fixed impedance members 22, 23, 24 and a condition responsive impedance member 25, which may be, for example, a temperature responsive element such as a NTC resistor. The bridge has a pair of output terminals 26 and 27, the former being connected to ground 30 by a ground conductor 31. The bridge is connected to control a transistor amplifier stage which comprises a transistor 32, shown for illustrative purposes as a pnp transistor. The transistor 32 includes a collector electrode 33, an emitter electrode 34 and a base electrode 35. The emitter electrode 34 is connected to ground by a conductor 36 and conductor 31. Base electrode 35 is connected to output terminal 27 of bridge 17 by a conductor 37. Collector electrode 33 is connected to a terminal 45 of a source of negative potential through a conductor 40, a resistor 41 and a conductor 42. A base bias resistor 29 is connected between junction 28 on conductor 37 and a junction 47 on the conductor 42. The source of negative potential 46 includes secondary winding 13, a diode rectifier 43, and a filter capacitor 44. The positive side of the potential source is connected to ground potential. A pair of output transistors 50 and 51 are controlled by the output of transistor 32. Transistor 50 has a collector electrode 52, an emitter electrode 53, and a base electrode 54, and transistor 51 has a collector electrode 55, an emitter electrode 56 and a base electrode 57. A pair of diodes 60 and 61, which may be germanium diodes, are connected in series with emitter electrodes 53 and 56 respectively by conductors 62 and 63. Emitter electrode 53 is connected to base electrode 57 through conductor 62, diode 60, a conductor 63, a junction 64, and a conductor 65, likewise emitter electrode 56 is connected to base electrode 54 through conductor 63, diode 61, a conductor 66, a junction 67 and a conductor 68. Base 54 and emitter 56 are connected to the previous stage transistor collector electrode 33 by a capacitor 70 connected between junction 67 and a junction 38 on conductor 40. Base electrode 57 and emitter electrode 53 are connected to emitter electrode 34 of transistor 32 by a conductor 71 connected between junction 64 and a junction 39 on conductor 36. Secondary winding 14 of the transformer 10 has a terminal 18 connected to the collector electrode 55 of transistor 51 by a conductor 72. A terminal 19 of the winding 14 is connected to the collector electrode 52 of transistor 50 through a conductor 73, a suitable load device 74, and a conductor 75.

*Operation*

In the drawing there is shown a null balance system. A. C. bridge 17 is energized by transformer winding 12. Assuming a condition such that the bridge is balanced there is no signal from output terminals 26 and 27 of the bridge. If conditions change so that condition responsive resistor 25 increases in resistance, an output signal of one phase will result, and if the conditions change in the opposite direction so that resistor 25 decreases, an output signal of the reverse phase will result. The A. C. output signal from the bridge is fed to the input of transistor 32, which is biased class A. The bridge signal is applied across emitter 34 and base 35 and results in an amplified alternating component being impressed on the D. C. current flowing in the collector circuit and through resistor 41. The alternating signal is coupled to the discriminator stage through coupling capacitor 70. Transistor stage 32 merely provides signal amplification and may be omitted if desired. The discriminator stage comprising transistors 50 and 51 is arranged to provide a full wave alternating output to a load directly without the use of input and output transformers. Let us assume an instantaneous polarity of the source such that terminal 18 of transformer winding 14 is negative with respect to terminal 19. Let us also assume the instantaneous signal potential at junction 67 is positive. Current will tend to flow from terminal 19 through load device 74, through the low impedance collector-base junction of transistor 50 in the forward direction, or direction of easy current flow, through conductors 68 and 66, diode 61 in the forward direction, conductor 63 to the emitter 56 of transistor 51. Since we assumed a signal potential such that base 57 is negative with respect to emitter 56, the transistor is biased to easily conduct current and the load current flows through the transistor and from collector 55 through conductor 72 to terminal 18 of the winding 14. The diode 60 in the emitter circuit of transistor 50 prevents any current from flowing out of the emitter circuit during the portion of the cycle transistor 50 is acting as a diode from collector 52 to base 54. On the succeeding half cycle terminal 18 becomes instantaneously positive with respect to terminal 19 of transformer winding 14. Now current tends to flow from terminal 18 through conductor 72 to collector 55 of transistor 51, through the collector-base junction in the forward direction, through conductors 65 and 63, through diode 60 in the forward direction, conductor 62 to emiter 53 of transistor 50. The instantaneous polarity of the signal having also reversed, junction 67 is negative with respect to ground so that base 54 is negative with respect to emitter 53 biasing transistor 50 for easy current flow. The load current flows through the transistor, from collector 52 through conductor 75 to the load 74, and from the load through conductor 73 to terminal 19 of winding 14. Diode 61 prevents current from flowing out of the emitter circuit 56 during the portion of the cycle transistor 51 is operating as a diode from collector 55 to base 57. Thus it is seen that only one transistor operates as a transistor on each half cycle, the other operating as a diode. The system is a proportional system so that as the signal unbalance from bridge 17 increases, the larger becomes the current permitted to flow through the load 74. The load device 74 which preferably is a proportioning device, may for example, control the condition being sensed by condition responsive resistor 25. As the condition being sensed changes so that the bridge 17 returns toward balance the signal magnitude decreases reducing the bias to the discriminator stage and the current flowing to the load 74 decreases. At a balanced condition of the bridge, with no A. C. signal being applied to the discriminator the load current is substantially cut off. A reverse condition from that previously described unbalances the bridge in the opposite direction producing a signal output of the opposite phase. When a signal of the opposite phase is applied to the input of the discriminator stage the transistors remain cut off and no current flows to the load. Thus with a signal of one phase applied a full wave A. C. output results and with a signal of the opposite phase the load is not energized. The transistors have been shown and described as p-n-p type, however, the invention is not so limited and by proper consideration of energizing polarities and the direction which diodes 60 and 61 are connected with respect to the emitters, any suitable transistor may be used. If the transistors 50 and 51 are n-p-n the diodes 60 and 61 must be connected to conduct in the opposite direction.

In general while I have shown a specific embodiment of my invention, it is to be understood that this is for the purpose of illustration and that my invention is to be limited solely by the scope of the appended claims.

I claim as my invention:

1. Transistor discriminator apparatus comprising: first and second transistors, said first transistor having a first base, collector, and emitter, said second transistor having a second base, collector, and emitter; first and second asymmetrical conducting devices each having an input and an output terminal, said output terminals of said first and second asymmetrical conducting devices being directly connected respectively to said first and second emitters; a source of alternating potential; means including load means connecting opposite terminals of said potential source intermediate said first and second collectors so that said transistors are energized out of phase; means directly connecting said first base to said second input terminal and directly connecting said second base to said first input terminal so that current flowing from said first base flows to said second emitter through said second asymmetrical conducting device; a source of alternating signal current of variable magnitude and reversible phase, said signal current source being connected to said first and second transistors in phase opposition, so that with a signal of one phase both transistors will conduct current on alternate half cycles of said potential source respectively, while a signal of the reverse phase prevents conduction of both transistors.

2. Transistor control apparatus comprising: first and second transistors, each of said transistors having a plurality of electrodes including a collector, an emitter, and a base electrode, two of said electrodes of each transistor comprising input terminals; direct current conductive means directly connecting said first transistor base electrode exclusively to said second transistor emitter electrode and directly connecting said second transistor base electrode exclusively to said first transistor emitter electrode; a source of alternating potential; load means; circuit means including said load means connecting the collectors of said transistors to opposite terminals of said alternating potential source so that said transistors are energized in phase opposition; a first current path through said transistors, said path being between emitter and collector; a second current path through said transistors, said path being between collector and base, so that during one half cycle current flows through the first current path of said first transistor and the second current path of said second transistor and on the succeeding half cycle current flows through said second current path of said first transistor and through said first current path of said second transistor; and a source of signal current connected to said input terminals to control the magnitude of current flow through said transistors.

3. Transistor control apparatus comprising: first and second transistors, each of said transistors having a plurality of electrodes including a collector, an emitter and a base electrode, two of said electrodes comprising the input terminals; first and second asymmetrical conducting means, conductive means directly connecting the base of said first transistor to the emitter of said second transistor through said second asymmetrical conducting means; conductive means directly connecting said base of said second transistor to the emitter of said first transistor through said first asymmetrical conducting means; a source of alternating current potential; load means; circuit means including said load means connecting the collectors of said transistors to opposite terminals of said potential source; and means connecting a source of alternating signal potential to the input terminals of said transistors to control the conduction of said transistors in response to said signal.

4. Control apparatus comprising: a pair of transistors, each of said transistors including a collector electrode, an emitter electrode and a control electrode; means including nonlinear impedance means directly connecting the emitter electrode of a first of said transistors to the control electrode of the second of said transistors, and directly connecting the emitter electrode of said second transistor to the control electrode of said first transistor; a source of alternating current potential; load means; circuit means including said load means directly connecting the collector electrodes of said first and second transistors respectively to opposite terminals of said source; and a source of alternating current signal potential connected to control the current flow through said transistors.

5. Control apparatus comprising: first and second transistors, each of said transistors having a collector electrode, a base electrode and an emitter electrode, two of said electrodes comprising input terminals; conductive coupling means directly connecting together the first transistor emitter electrode to the second transistor base electrode and also directly connecting together the second transistor emitter electrode to the first transistor base electrode; a source of alternating potential; means connecting said collector electrodes of said first and second transistors respectively to opposite terminals of said potential source; and means connecting a source of alternating signal of variable magnitude and reversible phase to the input terminals of said transistors.

6. Transistor control apparatus comprising: a signal current source of variable magnitude and reversible phase; a pair of transistors each having a plurality of electrodes including a collector, an emitter, and a base; conductive means directly connecting the base electrode of the first of said transistors to the emitter electrode of the second of said transistors, and also directly connecting the base electrode of said second transistor to the emitter electrode of said first transistor; output means; a source of alternating potential; means including said output means connecting said collectors to opposite terminals, respectively, of said source of alternating potential; circuit means connecting said signal current source to the emitter and base electrodes of said transistors, said signal being applied in opposite sense to each of said pair of transistors in such manner that a signal current of one phase controls conduction of said transistors so that a substantially continuous current flows through said transistors to said output means, while a signal current of the opposite phase substantially cuts off current flow to said output means.

7. Transistor control apparatus comprising: a signal current source of variable magnitude and reversible phase; a pair of transistors each having a plurality of electrodes including a collector, an emitter, and a base, at least one of said included electrodes of each transistor comprising output terminals; a pair of said included electrodes of each transistor comprising input terminals; conductive means directly connecting the base electrode of the first of said transistors to the emitter electrode of the second of said transistors, and also directly connecting the base electrode of said second transistor to the emitter electrode of said first transistor; output means; a source of alternating potential; means including said output means connecting said output terminals to opposite terminals, respectively, of said source of alternating potential, said potential having a frequency corresponding to the frequency of said signal current source; circuit means connecting said signal current source in phase opposition to said input terminals of each of said transistors in such manner that a signal current of one phase controls conduction of said transistors so that a substantially continuous current flows through said transistors to said output means, while a signal current of the opposite phase substantially cuts off current flow through said transistors to said output means.

References Cited in the file of this patent

UNITED STATES PATENTS

| | | |
|---|---|---|
| 2,622,212 | Anderson et al. | Dec. 16, 1952 |
| 2,665,845 | Trent | Jan. 12, 1954 |
| 2,695,381 | Darling | Nov. 23, 1954 |
| 2,728,857 | Sziklai | Dec. 27, 1955 |
| 2,778,978 | Drew | Jan. 22, 1957 |
| 2,783,384 | Bright et al. | Feb. 26, 1957 |

OTHER REFERENCES

Article, "Symmetrical Properties of Transistors and their Applications," Proceedings of the I. R. E. June 1953 by Sziklai.